Oct. 8, 1935.  F. O. CARLSON  2,016,483
HOUSING AND BRAKE FOR STEEL RULES
Filed May 23, 1933
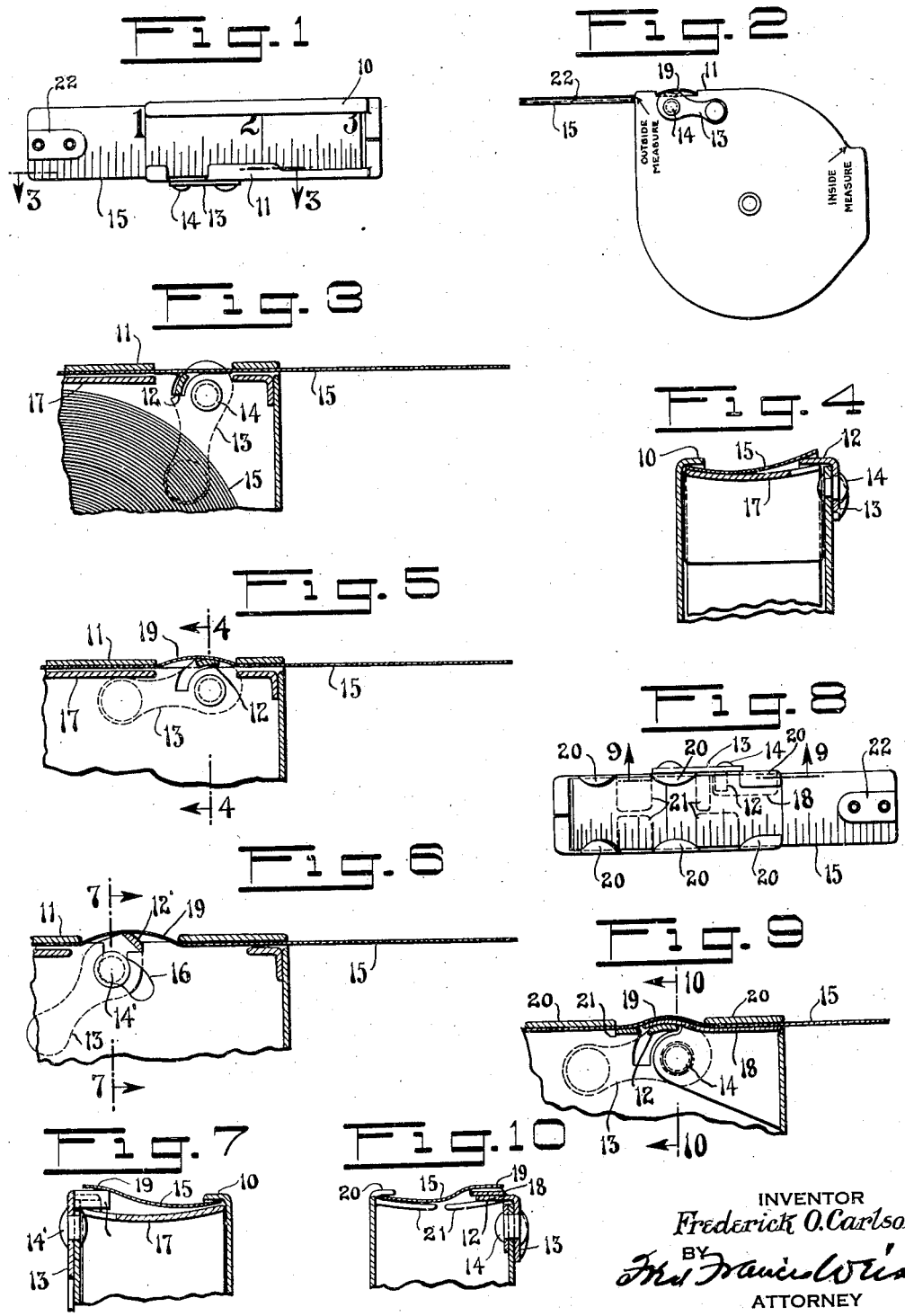
INVENTOR
Frederick O. Carlson
BY
ATTORNEY Patented Oct. 8, 1935

2,016,483

UNITED STATES PATENT OFFICE 2,016,483

HOUSING AND BRAKE FOR STEEL RULES

Frederick O. Carlson, New York, N. Y., assignor to Master Rule Manufacturing Co. Inc., New York, N. Y., a corporation of New York Application May 23, 1933, Serial No. 672,374

2 Claims. (Cl. 33—138)

This invention relates to a housing and brake for steel rules (preferably of the concave convex type) and has for its object the production of a simple, inexpensive and efficient housing having brake means for gripping an edge of the rule for adjustably holding the same in different measuring positions.

Another object includes the provision of housing shoes or lateral guides for embracing the edges of the rule at or immediately before the rule projects from the housing. In other words housing shoes or lateral guides are provided at the mouth of the casing for directional guiding of the uncoiled or projected part of the rule so that the same will project substantially in the plane of a tangent to the outer surface of the coil rule. That is to say I provide directional guides and supports on the lateral edges of the housing so as to support the rule from within, thus replacing the use of a lining.

Other objects will appear hereinafter, and I attain these objects by a construction illustrated in the accompanying drawing, in which Figure 1 is a plan view of a housing showing the mouth portion thereof with a rule partly extending therefrom;

Fig. 2 is a side elevational view thereof;

Fig. 3 is a fractional portion taken on the line 3—3 of Fig. 1;

Fig. 4 is a view taken on the line 4—4 of Fig. 5;

Fig. 5 is a view similar to that of Fig. 3 but showing the brake mechanism in applied position;

Fig. 6 shows a different type of brake lever;

Fig. 7 is a view taken on line 7—7 of Fig. 6;

Fig. 8 is a plan view showing a different type of housing shoe and lateral directional guides;

Fig. 9 is a view taken on line 9—9 of Fig. 8;

Fig. 10 is a view taken on line 10—10 of Fig. 9.

The same reference characters indicate like parts throughout the several views.

It is one of the prime purposes of my invention to provide convenient means whereby a rule of the concave convex type may be easily applied for measurements and then fastened in position without injury to the rule itself. One way of accomplishing these advantages is by supplying a brake housing of the type illustrated in Fig. 1 or 2 with lateral directional guides or housing shoes 10 and 11. By referring to Fig. 1 it will be noted that guide 10 comprises a continuous edge portion of the side of the housing, while guide 11 is provided with a cutaway portion near the one end thereof. In this cutaway portion plies the finger 12 of a brake lever 13. This brake lever is mounted on the side of the housing by any suitable means such as pivot 14. In one form of construction pivot 14 fastens the lever directly to the side of the housing while in another form it is removably held as will be more fully stated below. The finger 12 is a continuation of the lever, and is bent at right angles to the main body thereof so that its end extends into the path of the rule 15 in the manner shown by Figs. 3 and 5. It will be observed that when the lever is in applied position as shown in Fig. 5, that the finger displaces or bows one edge of the rule and in that manner secures the rule in position for taking measurements.

In a modified type of brake lever shown in Figs. 6 and 7 the pivot pin 14' is carried by the lever and movably slides in a slot 16 so that the pin is in the upper part of the slot when the brake finger 12' is in operative position, as shown in Fig. 6. Upon swinging the end of the lever down the pin moves into the lower portion of the slot and thus releases the rule, as the contact surface of the brake finger rolls away from the rule.

When the brake mechanism is in open position the rule may be withdrawn or coiled up within the housing by pulling the same out and pushing it back into the casing again. In other words, the rule is floatingly held on the coil for an easy movement, and the brake mechanism secures the rule in fixed position. Thus it will be seen that the brake levers adjustably hold the rule.

In order to guide the rule directional lateral guides 10 and 11 and a lining 17 are provided. Between this lining and the directional guides the edge of the rule passes in and out of the housing. It therefore follows that when the rule is unwound any distance for taking measurements, it unwinds and winds up along the directional path formed by the lateral directional guides on the casing. This path lies in a plane tangential to the outer coil of the rule. This arrangement facilitates the use of the rule in taking measurements either for outside measurements or inside measurements.

The brake lever is so located that it may easily be moved back and forth on this pivot by the thumb or finger. In some cases it may be desirable to have the brake finger protected against injury to the lateral edge of the rule. Where this is desired a special lining 18 (Fig. 10) is provided. This lining protects the edge 19 of rule 15.

In Fig. 8, I have shown a housing provided with a modified type of lateral directional guides and supports for the rule. These guides and supports are formed from the edge of the housing by stamping the edge into tabs 20 which constitute the outer directional guides for the rule on the one hand and downwardly bent plates 21 which constitute the inner supports for the rule on the other hand. It will thus be seen that plates 21 are provided to replace the lining 17 of the type described above. This arrangement constitutes an efficient but less expensive form of construction for the housing. The brake mechanism applied in this type of construction is the same as that used in the form shown in connection with Figs. 1, 2, 3 and 5.

In order to facilitate manipulation of the rule, particularly when it is closed I provide a thumb piece 22 at the outer end of the rule.

In using the rule it is only necessary to lay the housing on the object to be measured with the mouth or open part against the surface to be measured while the brake lever is in open position, or as that shown in Fig. 3. When the proper length of rule has been applied the brake lever is moved in position shown in Fig. 5, which therefore holds the rule against movement. Any adjustment necessary can be made preferably before the lever is closed, but if the rule is moved while the lever is closed the flexibility of the rule will permit such adjustment without injury thereto. The advantage of having an open space in one of the lateral guides is apparent.

Various modifications will suggest themselves to those versed in the art, but I regard all such modifications as coming within the scope and spirit of my invention.

What I claim therefore as new and useful of my own invention and desire to secure by Letters Patent is:

1. A steel rule construction comprising the combination of a housing having an opening in the periphery thereof, a graduated steel tape supported in the housing in coil form with its free end extending through the opening, guide flanges formed on the housing at the sides of said opening so as to overlay the side edges of the tape, one of said guides being interrupted, and a brake member supported on the casing below the point of interruption and movable through the opening to deflect the tape at the opening to bind it against movement.

2. A steel rule construction comprising a housing having an opening in the periphery thereof, a graduated steel tape supported in the housing in coil form with its free end extending through said opening, and a plurality of longitudinally and transversely spaced guide flanges formed on the housing at the sides of said opening so as to overlie the side edges of the tape, some of said flanges engaging the tape on its outer face and some engaging the tape on its inner face.

FREDERICK O. CARLSON.